Figure 1:
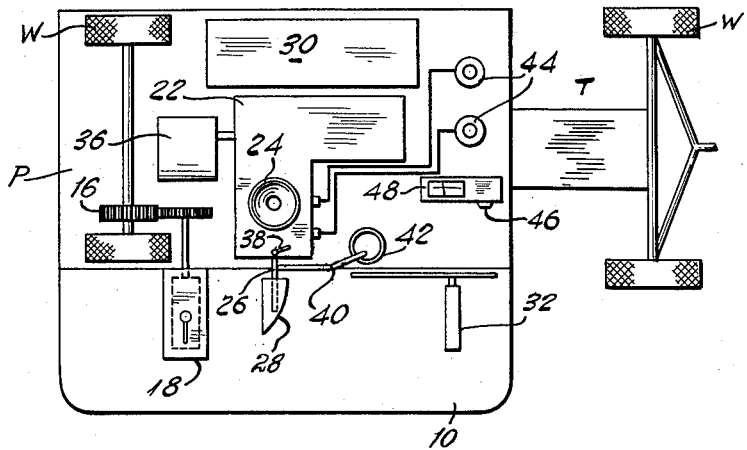

Jan. 19, 1965　　　H. G. CHINN ETAL　　　3,166,458
LARGE AREA SHEET SEALING

Filed Aug. 24, 1961　　　3 Sheets-Sheet 1

INVENTORS
HYMAN G. CHINN
WALTER H. HESSENTHALER
BY Richard S. Shreve Jr.
ATTORNEY INVENTORS
HYMAN G. CHINN
WALTER H. HESSENTHALER
BY Richard S. Shreve Jr.
ATTORNEY Jan. 19, 1965   H. G. CHINN ETAL   3,166,458
LARGE AREA SHEET SEALING
Filed Aug. 24, 1961   3 Sheets-Sheet 3

INVENTORS
HYMAN G. CHINN
WALTER H. HESSENTHALER
BY Richard S. Shreve Jr.
ATTORNEY

United States Patent Office 3,166,458
Patented Jan. 19, 1965

3,166,458
LARGE AREA SHEET SEALING
Hyman G. Chinn, Somerville, and Walter H. Hessenthaler, Lebanon, N.J., assignors to Union Carbide Corporation, a corporation of New York
Filed Aug. 24, 1961, Ser. No. 133,723
16 Claims. (Cl. 156—295)

This invention relates to field sealing and more particularly, to method and apparatus for joining strips of plastic, particularly polyethylene sheeting in the field to form a continuous large area sheet.

Such large area sheets are suitable for hay rick covers, swimming pool liners, ground covers, rain catch-pond liners, and many other applications. Present commercial thermoplastic forming equipment cannot produce sheeting wider than about 30 feet. Consequently, the very large area continuous sections, which can be as large as several acres in size, must be fabricated by joining together a number of commercial width strips.

This joining or sealing operation must be performed in the field at the end use location, since the shop fabrication, handling and shipping of such huge sections are totally impractical. Shop fabrication would require commensurately large areas and special handling equipment, which would be prohibitively uneconomical. Shipment of such large sections would, because of their weight and bulk, require special handling means and special transportation facilities; and handling at the job location would present formidable difficulties.

The main object of the invention is to provide apparatus and method for joining together, in the field, widths of plastic sheeting, particularly polyethylene sheeting, to form a large, continuous sheet. Other objects are to provide bonds which must be strong enough to resist separation by the physical abuse normally received during installation and use of the end product, to provide water-proof bonds to prevent passage therethrough of water or water vapor, and to provide apparatus and method capable of providing such seals at high speed and operable for a wide range of sheet thicknesses.

The sealing apparatus of this invention travels across and continuously seals together the thermoplastic sheet sections, which are laid out and positioned on the job site. Strong, separation resistant, continuous, waterproof seals may be made at speeds up to several hundred feet per minute. Neither seal quality nor sealing speed is affected adversely by sheet thickness irregularities. The method and apparatus are extremely versatile in that they can be used to join sheets of just about any composition and any thickness.

The sealing means proper may be of several different types, such as solvent, cement, or electronic sealing means, disclosed in the copending applications of C. E. Staff, Serial No. 650, 380, filed April 3, 1957, now U.S. Patent No. 3,063,899, and W. A. Seubert, Serial No. 704,578, filed December 23, 1957, now U.S. Patent No. 3,068,137. The preferred type is the extruded bead sealing means disclosed in the copending application of Haine and Chinn, Serial No. 594,929, filed June 29, 1956, now U.S. Patent No. 3,008,862. This effects a strong, homogeneous seal by extruding one or more thin, hot beads of thermoplastic material directly between overlapped portions of the sheet sections just as said overlapped sections enter the bight between a pair of pinch rolls or other suitable pressure providing means, and provides the following additional advantages.

The heat is applied directly to the two surfaces to be joined, thereby eliminating the rate-retarding dwell time, the danger of thermal degradation, and the other disadvantages inherently associated with conventional heat sealing methods which require driving the heat through the thermoplastic section. Seal formation is virtually instantaneous, and very high sealing speeds are therefore possible.

Seal width and seal thickness can be adjusted over a fairly wide range without any changes in equipment, merely by adjusting the extrusion rate and travel speed.

The method is much less critical in operation than conventional methods. Good quality seals are produced over a comfortably wide range of extrusion rates and temperatures and sealing speeds. Further, seal quality is not discernibly impaired by variations in web thickness or gauge which would be great enough to cause seal discontinuities because of uneven thermal or electrical contact and uneven pressure in the conventional techniques.

Seal quality and uniformity are improved. The seals are free of discontinuities; and the mechanically injurious effects inflicted in conventional heat sealing procedures by the heating bar and wheel edges are eliminated, as is the very troublesome sticking problem.

The bead sealing method securely bonds together certain materials which cannot be joined satisfactorily by any conventional heat sealing procedure. For instance, polyethylene surfaces which have been flame treated or otherwise treated to insure printability or proper adhesion thereto of an overlay film become progressively more difficult to heat seal by conventional methods, and overtreatment is therefore scrupulously avoided. However, even overtreated polyethylene can be bonded firmly and reliably by the bead seal method.

The new apparatus and method may also be useful for shop fabrication of moderately large sections. As yet, little thick film fabrication work is carried out in-plant due to lack of suitable equipment for sealing reliably and at economically favorable speeds. The unit described herein may be useful in this direction.

Figure 2:
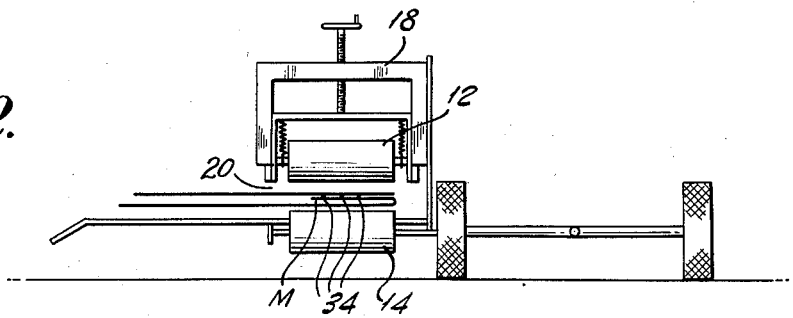
Figure 3:
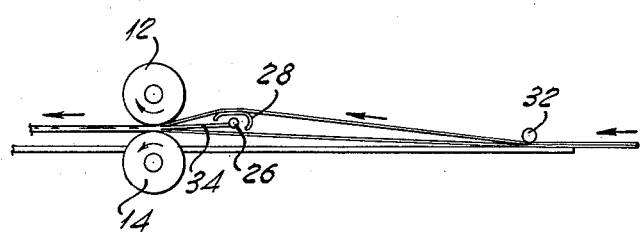
Figure 4:
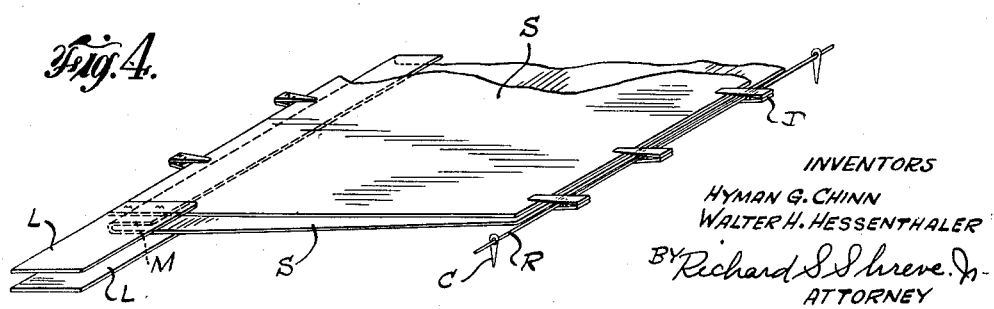
Figure 5:
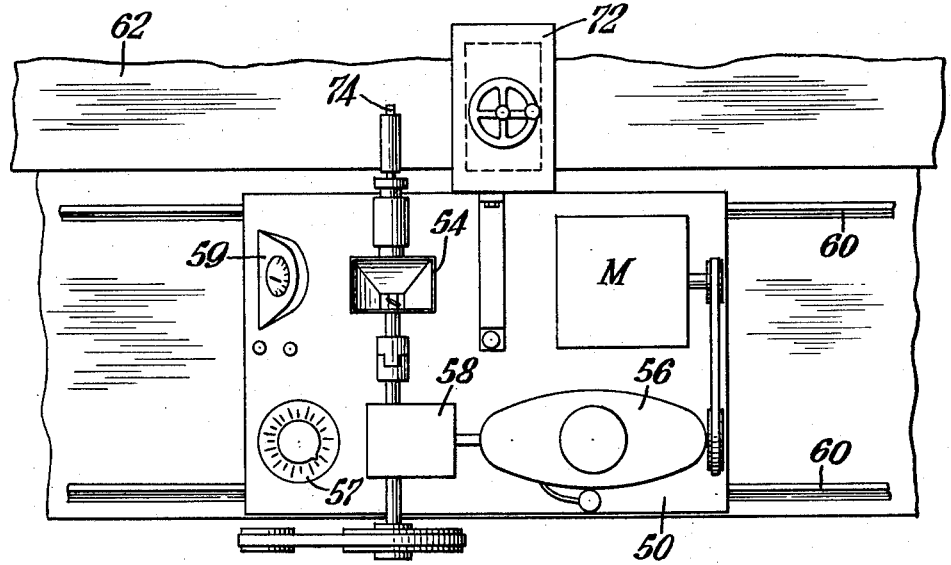
Figure 6:
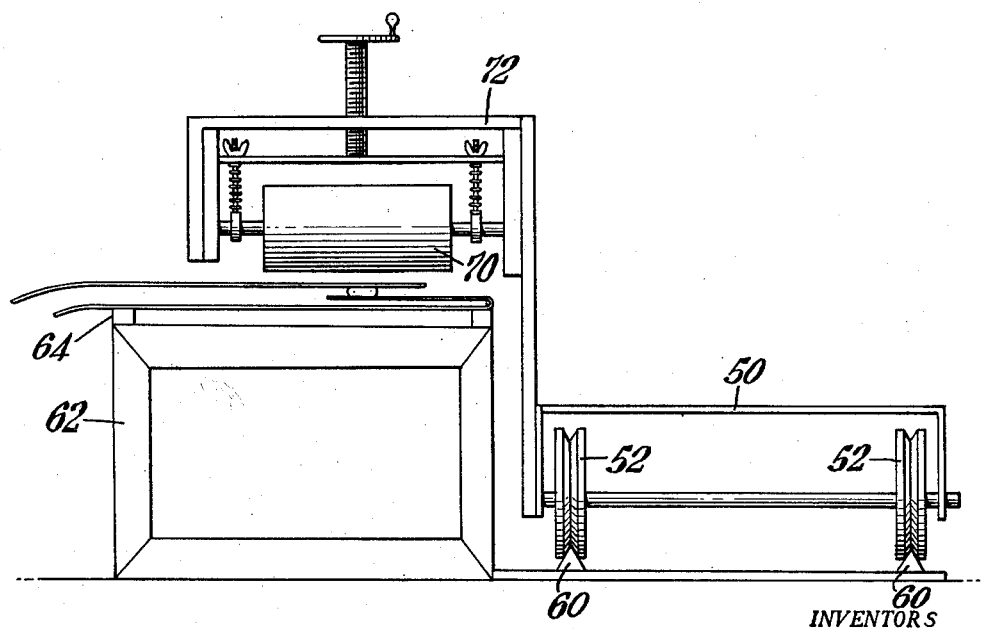
Figure 7:
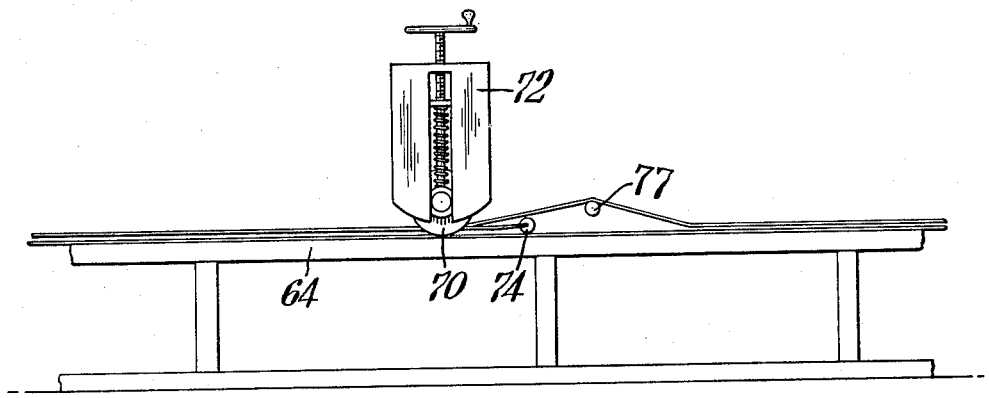
Figure 8:
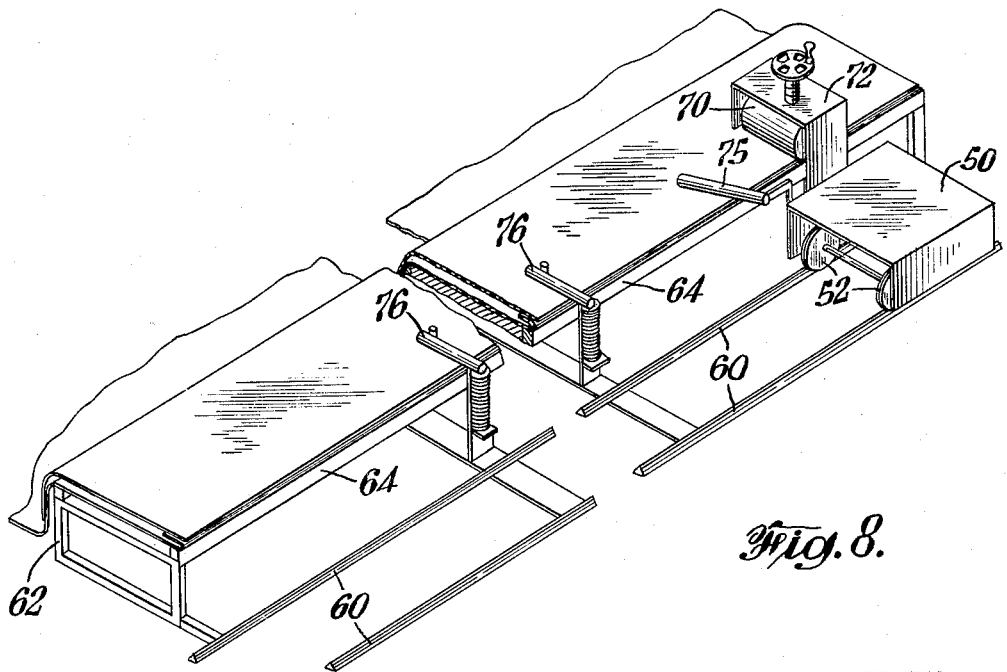

FIGURE 1 is a plan of apparatus according to, and for carrying out the method of, the present invention;
FIGURE 2 is a front elevation of the same;
FIGURE 3 is a side elevation of the same;
FIGURE 4 is a perspective view showing the wind anchor for the sheet assembly;
FIGURE 5 is a plan of modified apparatus;
FIGURE 6 is an end elevation of FIGURE 5, showing the pressure roller;
FIGURE 7 is a side elevation of FIGURE 6; and
FIGURE 8 is a perspective view of FIGURE 5.

The apparatus comprises a carriage or trailer T supported by wheels W and having a platform P approximately five feet long by three feet wide to support the cooperating parts of the apparatus, to maintain them in proper spaced relationship, and to travel them across the film sections. An approximately five feet long film platform 10 is attached to one side of the trailer platform and protrudes from one side thereof to the extent of about two feet. Said film platform 10 rides about six to eight inches off the ground and contains a cut-out to receive a set of pinch rolls 12 and 14.

These pinch rolls overhang the trailer on the same side as the film platform and are positioned so that the bight between said rolls is slightly above the level of the film platform 10. The lower pinch roll 14, which is preferably rubber covered, is driven by chain and sprocket drive 16 from the trailer wheels in such manner that the surface speed of said roll is equal to the speed of the trailer relative to the ground. The upper pinch roll 12, which is preferably of steel, is positionably mounted relative to the lower roll 14, whereby the opening between said rolls can be adjusted to provide the appropriate pressure, and it is friction driven by the sheet. The pinch roll assembly 12 and 14 is supported from one side only by a frame 18 with an open throat 20 toward the off side of the film platform 10. Thus, as the apparatus traverses the sheets and said sheets are picked up from the ground by the film platform which is therefore designated as a lifter, they can pass freely through the pinch rolls with the main width of the sheets extending out through the throat 20.

The pressure between the pinch rolls 12 and 14 is not particularly critical provided that said pressure is sufficient to provide intimate, firm and continuous contact between the hot bead and both sheet sections. While it is not generally necessary to provide for roll cooling or heating, it is sometimes advantageous to cool the pinch rolls, particularly when thin films are being sealed at high rates of speed.

While pressure is generally most conveniently applied by means of a pair of driven pinch or nip rolls, such as those cited above, many alternative means may be used, as for example, pressure shoes, a rotating roll and fixed plate arrangement, etc.

A small extruder 22 having a feed hopper 24, tubular die 26 and a die cover 28 is mounted on the trailer so that the die 26 extends out beyond the trailer platform 10 a short distance in front of the pinch rolls 12 and 14. The tubular die 26 is closed at its far end and has openings on the side facing the nip of the pinch rolls, whereby the extrudate or hot melt is directed theretowards. The die cover or shield 28, which partially surrounds the die 26, confines the heat within the die area and prevents thermal damage to the sheets which pass above and below it and often come into contact with the shield during the sealing operation.

A gasoline driven generator 30 supplies electrical power for the extruder barrel heaters and die heaters and for the extruder screw drive motor.

A sheet guide system 32, which is attached to the film platform 10, keeps the sheet sections to be joined in proper alignment and directs them respectively above and below the die cover 28, then back into proper register and into and through the nip of the pinch rolls 12 and 14. The hot extruded bead 34 is directed between said sheet sections just as or immediately before they enter the pinch roll nip.

That part of the extruder 22 adjacent to the feed hopper 24 is cooled by passing cooling water through the rear section of the extruder jacket. A tank 36 (in this instance, a five gallon can) on the trailer platform serves as a water reservoir. The tank 36 is mounted at a sufficient elevation relative to the extruder so that the water flows by gravity from said tank through the extruder jacket and on to the ground behind the trailer.

A bifurcating type valve 38 (such as a 3-way valve with a 2-port key) and a by-pass line 40 are placed in the extrusion path immediately ahead of the die 26. The valve 38 is used to direct the hot metal from the extruder through the die 26 when the sealing operation is in progress or through the by-pass line 40 and into the waste receptacle 42. The latter arrangement keeps the hot melt away from the sealing area proper during the setting-up period and whenever the sealing operation is interrupted for any reason.

Extrudate temperature is controlled by adjusting the voltage input to the extruder barrel and die heaters by means of variable transformers 44. Beneath each heater and at appropriate points along the extruder barrel and die are placed thermocouples, which are connected to a five point switch 46, which is in turn connected to a temperature indicator 48, whereby the temperature at any of these salient extruder points can be determined at any time, and appropriate voltage input adjustments can be made accordingly.

The trailer is drawn by a tractor (not shown), which is available on most farms and other open field locations where such thermoplastic sheet installations are generally made.

The rate of extrusion of the hot bead 34 is adjusted, according to the speed of the tractor, by regulating the variable speed extruder screw drive.

In operation, two strips of plastic sheeting S are laid out, one atop the other, on suitably flat terrain. The edges to be joined are aligned directly, if a pouch type seal is desired or, if a lap type seal is desired, the edge margin M of one strip is first folded back to face the other strip. The latter type seal is usually preferred because it is much the stronger, since a transverse pulling force creates only a shearing stress thereon, but operates to peel apart a pouch type seal.

A wire R running through a line of ground stakes C serves as a wind anchor to which the sheet assembly is easily moored by clothes pins D or other suitable means. Alternatively, weights, clamps, or other holding devices can be used to secure the assembly against the wind, if necessary.

The aligned edges to be sealed are temporarily clamped together, suitably with clothes pins D. A narrow strip L, sutiably of poly(tetrafluoroethylene) coated glass cloth, is attached to the forward end of each sheeting strip as by stapling, to serve as a leader. The two leaders are threaded through the sheet guide system 12, around the extrusion die 26 and through the pinch rolls 12 and 14. The sealer is then started, i.e., the valve 38 is positioned so the hot melt issues through the die 26, and the trailer is drawn along a path parallel to the aligned sheet edges, whereby the overlapped margins of the sheets are firmly bonded together by a bead seal.

When the sealer has traversed the full length of the strip assembly, the hot melt is again directed through the by-pass line 40 into the waste receptacle 42; the upper sheet layer is opened out to expose its unbonded edge; a third sheet strip is then positioned relative to said unbonded edge; and the above-described process is repeated to provide the next parallel seal; etc., until the desired sheet size is attained.

The improved unit shown in FIGS. 5, 6, 7 and 8 can be used for in-plant as well as field operations, is less bulky, easier to maneuver and control, operable on bumpy terrain, requires no adjustment to compensate for variation in tractor speed, and requires less manual control by only one operator.

This unit comprises a carriage 50 supported by wheels 52 having a platform approximately two feet long by a foot and a half wide. The carriage supports an extruder 54 driven by a motor M through a hydraulic transmission unit 56 and a speed reducer 58. The extruder is provided with a temperature controller 57 and indicator 59.

The sealing unit travels along a set of tracks 60 parallel to the edge of a table or bench 62 (FIG. 6) for plant operation, and parallel to the edge of a raised film platform 64 (FIG. 8) for field operation. In this form, the sections of track and raised platform are built as a single unit. The output shaft of the speed reducer has a clutch 66 for a belt drive to the wheels 52. Thus, at any one set of temperatures, the output of the extruder is approximately proportioned to the speed of the unit.

A single free rolling rubber covered pressure 70 is journaled in a cantilever frame 72 which overhangs the table or bench 62 along which the roller 70 travels for in-plant use, or film platform 64 for the outdoor set up. This roller 70 is friction driven by the film being sealed.

The extruder 54 has a die 74 which extends out from the carriage a short distance in front of the pressure roller 70 and follows the lifter 77. A series of film clamps 76 hold the edges of the film to be sealed in place along the platform, and are released successively by the trip 75 on the sealing unit as it moves along the tracks and seals the edges of the film together.

This application is in part a continuation of our allowed application Serial No. 769,815, filed October 27, 1958, now abandoned.

What is claimed is:

1. Method of sealing strips to form a large area sheet, which comprises laying out a pair of strips one atop the other in stationary substantially flat parallel relation with their adjacent edges aligned and their margins overlapping, progressively picking up a localized portion of the upper of said margins to raise the same above the other, progressively extruding a sealing medium under said raised localized portion, progressively depressing said upper margin behind said extrusion operation into contact with the lower of said overlapping margins, and simultaneously progressing said picking up, extruding and depressing steps in tandem longitudinally along said upper margin by traction along a path parallel thereto.

2. Method of sealing strips to form a large area sheet as claimed in claim 1, in which said strips and the resultant large area sheet are of plastic.

3. Method of sealing strips to form a large area sheet as claimed in claim 1, in which said strips and the resultant large area sheet are of polyethylene.

4. Method of sealing strips to form a large area sheet as claimed in claim 1, in which the upper of said pair of strips is opened out to expose an unbonded margin, a third strip is positioned parallel to said opened out upper strip with the unbonded margins of said third strip and said upper strip overlapping, and said picking up, extruding and depressing steps are progressed simultaneously in tandem along said last mentioned overlapping margins by traction along a path parallel thereto.

5. Method of sealing strips to form a large area sheet, which comprises laying out a pair of strips one atop the other above a suitable terrain in substantially flat stationary parallel relation with their adjacent edges aligned and their margins overlapping at one side thereof, picking up a localized portion of the upper of said margins to raise the same above the other, applying sealing medium under said raised localized portion, pinch rolling said margins together, and simultaneously progressing said picking up, sealing medium applying, and pinch rolling steps in tandem along said upper margin by traction along a path parallel thereto.

6. Apparatus for sealing strips to form a large area sheet, which comprises in combination, ground clamps for maintaining a pair of strips one atop the other on a suitable terrain in substantially flat stationary parallel relation with their adjacent margins overlapping, a vehicle propelled by rolling traction on said terrain along a path parallel to said margins, a platform carried by said vehicle riding off the ground for picking up said overlapping margins from said terrain, and a sealer carried by said vehicle along and between said overlapping strip margins.

7. Apparatus for sealing strips to form a large area sheet, which comprises means for maintaining a pair of strips one atop the other on a suitable terrain in substantially flat stationary parallel relation with their adjacent margins overlapping at one side thereof, a vehicle propelled by traction on said terrain along a path parallel to said margins, a lifter carried by said vehicle for picking up said overlapping margins from said terrain, and a sealer carried by said vehicle traversing an outlet for sealing medium along and between said stationary overlapping margins, and a pair of nip rollers carried by said vehicle tandem to said sealer for traversing pinch surfaces tandem to said sealing outlet along the opposite sides of said stationary overlapping margins.

8. Apparatus for holding and sealing strips to form a large area sheet, which comprises ground anchors engaging registering margins at one side of a pair of strips positioned one atop the other for maintaining said pair of strips in superimposed substantially flat stationary parallel relation in the field with their free margins at the other side thereof overlapping, a vehicle propelled by traction along the terrain in a path parallel to said margins, an extruder mounted on said traction propelled vehicle having an outlet for extruding sealing medium between said overlapping free margins and a pair of pinch rolls journalled on said traction propelled vehicle in tandem to said sealing outlet and engaging the opposite sides of said margins with said sealing medium therebetween.

9. Method of sealing strips to form a large area sheet, which comprises laying out a pair of strips one atop the other above a suitable terrain in substantially flat stationary parallel relation with their adjacent edges aligned and their margins overlapping at one side thereof, picking up at least one of said overlapping margins from said substantially flat relation by passing thereunder a lifter riding off the ground and propelled by rolling traction above said terrain along a path parallel to said margins, and propelling a sealer along said overlapping margins at the same side of said pair of strips by the same traction.

10. Method of sealing strips to form a large area sheet as claimed in claim 9, in which said strips and the resultant large area sheet are of plastic.

11. Method of sealing strips to form a large area sheet as claimed in claim 9, in which said strips and the resultant large area sheet are of polyethylene.

12. Method of sealing strips to form a large area sheet as claimed in claim 9, in which the said pair of strips having their margins so sealed together at one side thereof is opened out to expose an unbonded margin at the other side of one strip of said pair, a third strip is positioned atop said opened exposed margin strip with their unbonded margins overlapping, and said lifter and sealer are traversed along said last-mentioned overlapping margins.

13. Method of sealing strips to form a large area sheet, which comprises laying out a pair of strips one atop the other above a suitable flat terrain in substantially flat stationary parallel relation with their adpacent edges aligned and their adjacent side margins overlapping at one side thereof, anchoring at least one of the other side edges thereof to maintain said pair of strips stationary, picking up said overlapping side margins by propelling by rolling traction along a path parallel thereto a lifter riding off the ground, directing a stream of hot melt along and between said stationary overlapping side margins by an extrusion die propelled by said traction above said lifter and moving along and between said stationary overlapping side margins, and pressing said margins with said melt therebetween by at least one pressure roller propelled by said traction tandem to said extrusion die and engaging said margins beyond said film lifter, and driving said roller at a surface speed equal to the speed of said traction relative to the ground.

14. Apparatus for sealing strips to form a large area sheet, which comprises in combination, means for maintaining a pair of strips one atop the other above a suitable terrain in substantially flat stationary parallel relation with their adjacent margins overlapping at one side thereof, a vehicle propelled by traction above said terrain along a path parallel to said margins, a lifter carried by said vehicle riding off the ground for picking up said overlapping margins from said terrain, and a sealer carried by said vehicle along said overlapping strip margins at the same side of said pair of strips.

15. Apparatus for sealing strips to form a large area sheet, which comprises means for maintaining a pair of strips one atop the other above a suitable terrain in substantially flat stationary parallel relation with their adjacent margins overlapping at one side thereof, a vehicle propelled by traction above said terrain along a path parallel to said margins, a lifter carried by said vehicle for picking up said overlapping margins from said terrain, a sealer carried by said vehicle traversing an outlet for sealing medium along and between said stationary overlapping margins, and a pressure roller carried by said vehicle tandem to said sealer for traversing pinch action tandem to said sealing outlet along the opposite sides of said stationary overlapping margins at the same side of said pair of strips.

16. Apparatus for holding and sealing strips to form a large area sheet, which comprises ground anchors engaging registering margins at one side of a pair of strips positioned one atop the other for maintaining said pair of strips in superimposed substantially flat stationary parallel relation in the field with their free margins at the other side thereof overlapping, a vehicle propelled by traction along the terrain in a path parallel to said margins, an extruder mounted on said traction propelled vehicle having an outlet for extruding sealing medium between said overlapping margins and a pair of pinch rolls journalled on said traction propelled vehicle in tandem to said sealing outlet and engaging the opposite sides of said margins with said sealing medium therebetween.

References Cited in the file of this patent

UNITED STATES PATENTS

| | | |
|---|---|---|
| 2,069,310 | Higgins | Feb. 2, 1937 |
| 2,084,625 | Stebbins | June 22, 1937 |
| 2,367,725 | Lindh | Jan. 23, 1945 |
| 2,664,938 | Torr | Jan. 5, 1954 |
| 2,740,233 | Reynolds | Apr. 3, 1956 |
| 3,008,862 | Haine et al. | Nov. 14, 1961 |
| 3,008,863 | Morris | Nov. 14, 1961 |